United States Patent

[11] 3,575,670

| | | |
|---|---|---|
| [72] | Inventor | John W. Hansen<br>North Plainfield, N.J. |
| [21] | Appl. No. | 787,367 |
| [22] | Filed | Dec. 27, 1968 |
| [45] | Patented | Apr. 20, 1971 |
| [73] | Assignee | Bell Telephone Laboratories, Incorporated<br>Murray Hill, Berkeley Heights, N.J. |

[54] APPARATUS FOR SYNCHRONOUSLY MODE LOCKING A PLURALITY OF LASERS
12 Claims, 2 Drawing Figs.

[52] U.S. Cl. .................................................. 331/94.5
[51] Int. Cl. .................................................. H01s 3/00
[50] Field of Search .......................................... 331/94.5

[56] References Cited
UNITED STATES PATENTS
3,414,840  12/1968  DiDomenico ............... 331/94.5

*Primary Examiner*—Ronald L. Wibert
*Assistant Examiner*—T. Major
*Attorneys*—R. J. Guenther and Arthur J. Torsiglieri ABSTRACT: The longitudinal modes of a plurality of lasers are synchronously mode locked by means of an intracavity mode-locking device (e.g., a phase modulator, an acoustically excited mechanism, or a bleachable dye) common to the cavity resonator of each of the lasers, the lengths of each of the resonators being an integral multiple of each other. If, in addition, the resonators are designed such that the longitudinal mode-separation frequency is an integral multiple of the transverse mode separation frequency, both the transverse and longitudinal modes will synchronously and simultaneously phase lock, producing in each resonator a pulse which traverses a zigzag path bouncing back and forth between the resonator reflectors.

PATENTED APR 20 1971    3,575,670

INVENTOR
J. W. HANSEN
BY
Arthur J. Torsiglieri
ATTORNEY

APPARATUS FOR SYNCHRONOUSLY MODE LOCKING A PLURALITY OF LASERS

BACKGROUND OF THE INVENTION

This invention relates to mode-locked lasers and, more particularly, to apparatus for synchronously locking the modes of a plurality of lasers.

One of the most promising uses of the laser is in the field of communications where the large bandwidths available at optical frequencies represent virtually unlimited information carrying capabilities. Information may be impressed upon an optical beam by well-known amplitude or frequency-modulation techniques, but pulse code modulation due to its obvious advantages is a preferred method and consequently has induced workers in the art to attempt to produce a laser, whose output is a pulse train which could serve as the carrier in a pulse code modulation optical transmission system, the pulse train being encoded by the selective elimination of pulses in accordance with information to be conveyed.

One general method of producing such a pulse train involves mode locking. A variety of techniques, both passive and active, have been devised by the prior art to mode lock the longitudinal modes of a laser. One of the passive techniques is essentially a form of Q-switching employing a bleachable dye the optical absorptivity of which tends to saturate with increasing optical power whereupon the absorptivity abruptly decreases i.e., the dye "bleaches." See, for example, Appl. Phys. Let. 7, 270 (1965) (mode locking of ruby laser by a solution of cryptocyanine in methyl alcohol) and Appl. Phys. Let. 8, 175 (1966) (mode locking of $Nd$: glass laser by Eastman Kodak 9740 dye). Among the active techniques is the use of an intracavity synchronous acoustic modulator as taught by L. E. Hargrove in U.S. Pat. No. 3,412,251 issued on Nov. 19, 1968, whereby "synchronous" it is meant that the modulator is driven at the longitudinal mode-separation frequency. In that device, the electrical output of the modulator is transformed into an acoustic wave which generates a standing wave of index of refraction in an appropriate medium (e.g., a fused silica) disposed in the beam path. Changes in index of refraction periodically deflect energy from the resonator so that in effect the device is a synchronous loss modulator. Another active technique involves synchronous intracavity phase modulation in which an appropriate electro-optic crystal, typically potassium dihydrogen phosphate (KDP), is disposed within the resonator and is driven by an electric field varying at the longitudinal mode separation frequency. For a detailed discussion of such modulators see "Electro-optic Light Modulators," by Kaminow and Turner, Applied Optics, 5, 1612 (1966). The longitudinal mode-locking phenomena has been studied in detail by such workers as M. H. Crowell in his article "Characteristics of Mode-Coupled Lasers," IEEE, JQE-1, 12 (1965).

In a multichannel (i.e., multiplex) communication system employing separate carriers for each channel, it may be desirable that each of the carriers be synchronized so that, for example, when information transmitted in separate channels is recombined at a remote receiver, the components in each channel retain their original phase relationships. In an optical communication system employing a plurality of mode-locked lasers to generate the aforementioned carriers, it would therefore be desirable that each of the lasers be synchronously mode locked.

It is, therefore, a broad object of this invention to synchronously mode lock a plurality of lasers.

It is a more specific object of this invention to synchronously mode lock a plurality of lasers by means of a mode-locking device common to each laser.

Another useful device in an optical communication system is an optical scanner which, for example, could be employed to address one or more optical memory matrices. In such an application it may be desirable to utilize several synchronous scanners to address separately and synchronously each of a plurality of memory matrices.

It is, therefore, still another object of the present invention to generate a plurality of synchronously scanning optical beams.

SUMMARY OF THE INVENTION

In accordance with an illustrative embodiment of the invention, the longitudinal modes of a plurality of lasers are synchronously mode locked by means of an intracavity mode-locking device (e.g., a phase modulator, an acoustically excited mechanism or a bleachable dye, as previously described) common to the resonator of each of the lasers, the lengths of each of the resonators being an integral multiple of each other.

In the case of synchronously mode-locking two lasers, the mode-locking device is located within the cavity resonator of each laser. That is, the intracavity beam paths of the two lasers are made to intersect and the device is located at the point of intersection. Where the device is a bleachable dye, it is possible in theory to consider one of the lasers as the "master" oscillator which bleaches the dye, whereas the other laser is considered to be "slaved" to the master. In this manner, the slave laser is synchronized to the master laser. In practice, however, with two nearly equivalent lasers, there will be bleaching of the dye by both.

If, in addition, the resonators of each laser are designed such that the longitudinal mode-separation frequency is an integral multiple of the transverse mode-separation frequency, both the transverse and longitudinal modes will phase lock, producing in each resonator a pulse which traverses a zigzag path bouncing back and forth between the resonators reflectors. The output of each laser is a scanning beam of light, each of the beams being synchronized with each other.

BRIEF DESCRIPTION OF THE DRAWINGS

The invention and its objects, together with its various features and advantages, can be easily understood from the following more detailed discussion taken in conjunction with the accompanying drawings, in which.

DETAILED DESCRIPTION

Figure 1:
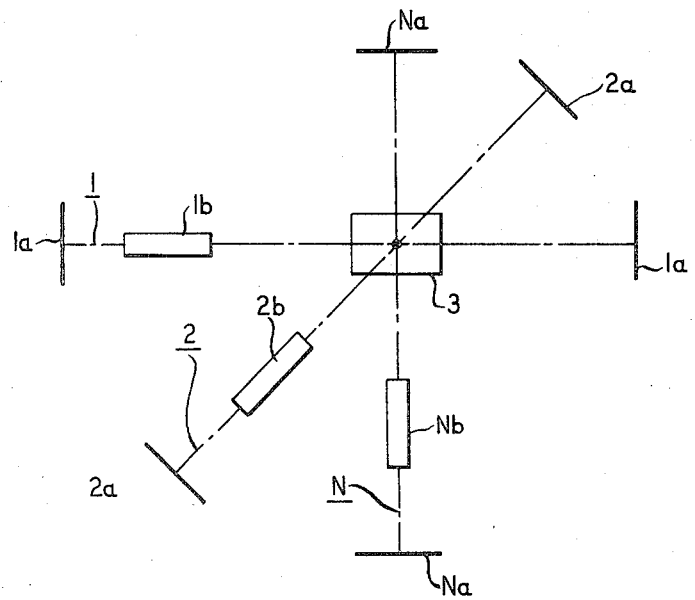
FIG. 1 is a schematic of a general embodiment of the invention.

Turning now to FIG. 1, there is shown a general embodiment of the invention comprising a plurality of lasers 1, 2... N each having a resonator formed by a pair of oppositely facing parallel reflectors 1a–1a, 2a–2a... Na–Na, respectively. Within each resonator and on its longitudinal axis is disposed an active medium 1b, 2b... Nb, respectively, which may comprise either a solid, liquid or gas as is well known in the art. The axes of each resonator intersect at a common intracavity point where there is disposed a mode-locking apparatus 3 common to each resonator. As described previously the apparatus 3 may include any of several well-known mode-locking devices (including associated modulator drives where appropriate) such as a phase or loss modulator driven at the longitudinal mode-separation frequency $f_L$, an acoustically excited mechanism also driven at $f_L$, or a passive device such as a bleachable dye. Provided that the lengths of each resonator are an integral multiple of each other, the device 3 causes the longitudinal modes of each of the lasers to be synchronously mode locked (i.e., phase locked). Generally, a phase modulator or acoustic modulator is preferably used in conjunction with a gas laser, whereas a bleachable dye is used in conjunction with a solid state laser. However, it is to be noted that an acoustic cell has been used to mode lock an $Nd$: YAG laser. See Applied Physics Letters 8, 180 (1966).

Passive Mode Locking

Figure 2:
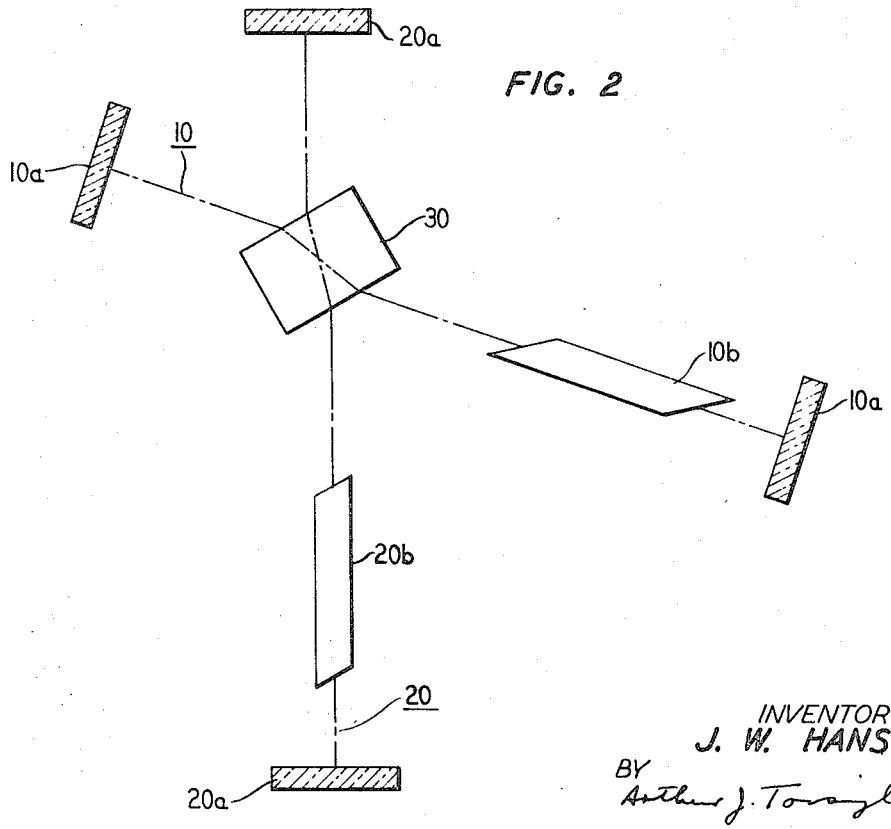
FIG. 2 is a schematic of an embodiment of the invention employing two lasers.

In an illustrative embodiment, as shown in FIG. 2, two lasers 10 and 20 each comprise a pair of plane parallel mirrors 10a-10 and 20a-20a, respectively forming resonators of nearly equal length in each of which is disposed an active medium (e.g., a ruby or Nd: glass rod) 10b and 20b, respectively. The resonators are oriented so that their axes intersect at a point within the cavity of both resonators. At this intracavity point is disposed a transparent cell 30 containing a bleachable dye (e.g., Eastman Kodak 9860 for use with Nd: glass lasers or a solution of cryptocyanine in methyl alcohol for use with ruby lasers). As depicted in FIG. 2, the beam path of each laser is shown to be refracted as it enters and leaves the cell 30 due to the assumed higher index of refraction of the dye as compared to the index of refraction of the surrounding medium (i.e., air).

The operation of the invention in theory can be explained, as briefly mentioned before, by assuming that one of the lasers is a "master" laser whereas the other is "slaved" to it. That is, assume that laser 20 is the master laser and is longitudinally mode locked by the periodic bleaching (i.e., saturation) and unbleaching of the dye in cell 30. The energy distribution of laser 20 can be described as a packet of energy which bounces back and forth between reflectors 20a-20a striking an end reflector every 2L/c seconds, where L is the optical length of the resonator of laser 20 and c is the velocity of light. The longitudinal motion of this packet is in step with the periodic bleaching and unbleaching of the dye. Consequently, the beam of slave laser 10, which also passes through the dye in cell 30, will experience minimum loss only at those times when the dye is bleached by master laser 20, and conversely, maximum loss when the dye is not bleached by laser 20. Thus, the energy distribution most favorable to slave laser 10 to minimize its loss and thus permit lasing to occur, is also a packet of energy bouncing back and forth between reflectors 10a-10, and most importantly, with that packet arriving at cell 30 at substantially the same time as the packet of energy traversing master laser 20. That is, the packets of energy are synchronized or, putting it another way, the two lasers are synchronously mode locked.

Typically, the cell length is of the order of 1 mm. In general, however, it is desirable that the length of the cell be less than the length of the region that could be bleached by the laser pulse. The extent of that region is well known to be a function of the pulse length and the dye lifetime. This ensures that at some time in the duration of the applied laser pulse the entire cell is bleached in the region intercepted by the laser beams. This avoids having a traveling bleached spot and the attendant problems associated with the fact that beams at different entrance angles effectively would see the spot moving at different velocities.

Active Mode Locking

A similar analysis applies to synchronously mode-locked lasers employing an active mode-locking device, except that in such a case the lasers are all slaved to the active modulator.

With reference again to FIG. 2, if the device 30 were a phase modulator (e.g., an electro-optic crystal such as KDP) then an electric field would be applied along the optic axis of the crystal, i.e., in the plane of the paper of FIG. 2. The beams would be properly oriented with respect to the crystal axes for efficient modulation, and the modulator drive (not shown) would be set at the longitudinal mode separation frequency $f_L$. In addition, the entrance faces of the crystal could be cut at Brewster's angle to minimize reflection loss, as is well known in the art. In the simple case of two lasers being synchronously mode locked by a phase-modulated KDP crystal, the polarization of each beam should be at 45° to the X-Y axes of the crystal and the Z-axis should lie in the plane defined by the two beam directions and should bisect the angle between them in order that each beam experience the same phase retardation, i.e., phase modulation. In general, with more than two beams, the latter criterion is satisfied by directing the beams such that each of their propagation vectors be on the surface of a cone, the axis of which is coincident with the Z-axis (i.e., optic axis) of the crystal. It is also desirable that the crystal be cut, by techniques well known in the art, such that the optical path lengths of each beam in the crystal are substantially equal to each other. In this manner, it is further insured that each beam will experience the same phase retardation.

On the other hand, where an acoustic modulator is employed, the device 30 would be a medium (e.g., fused silica) in which a standing wave of index of refraction could be established by means of an acoustic transducer (not shown) coupled to a modulator (also not shown) driven at $f_L$. The standing wave would be established normal to the beam paths (i.e., normal to the plane of the paper) so as to produce a phase grating in the medium. The propagation vectors of the beams (which need not be coplanar) should preferably lie in the planes of the phase grating (which in FIG. 2 would be parallel to the plane of the paper). In this case, however, the beam may enter the crystal at essentially any angle as contrasted with the limited useful angles of the phase modulator.

Resonator Lengths

As mentioned above, in order to achieve synchronous mode locking of a pair of lasers, it is desirable that the lengths of the resonators be nearly an integral multiple of each other. For simplicity, take the case of resonators of nearly equal length. By "nearly" it is meant that the lengths $l_1$ and $l_2$ should not differ by an amount $\Delta l$ greater than that which would produce a time shift in the pulse train output greater than the width of a typical pulse; that is, $$N(l_2-l_1)<c\tau \tag{1}$$

where N is the number of round trip passes a pulse makes in the duration of the train of output pulses, $c=3\times10^8$ m./sec. is the velocity of light, and $\tau$ is the pulse width, taken, for example, to be 3.0 picoseconds. Then $$N \approx 10\left(\frac{cT}{2l_1}\right) \tag{2}$$

where T is the time width measured at half-maximum of the envelope of the output train of mode-locked pulses. The factor of ten accounts for the time required for the pulses to grow from a low level. Combining equations (1) and (2) we get $$5cT\left(\frac{l_2-l_1}{l_1}\right)<c\tau \tag{3}$$

Then since $\Delta l=l_2-l_1$ and assuming T=30 nanoseconds, $$\frac{\Delta l}{l_1}<2.0\times10^{-5} \tag{4}$$

So that if $l_1$=100 cm., a typical resonator length, then $l_2$ should not differ from $l_1$ by more than $2.0\times10^{13}$ cm. A similar analysis would obtain in the general case of resonators having lengths an integral multiple of each other.

The foregoing example, including the parameters assumed, is illustrative only and is not to be construed as a limitation upon the scope of the invention.

Scanner

As mentioned previously, if, in addition, each resonator is designed such that the longitudinal mode-separation frequency $f_L$ is an integral multiple M of the transverse mode separation frequency $f_T$, then both the transverse and longitudinal modes will simultaneously and synchronously mode lock. The time dependent energy distribution within each resonator consists of a pulse of energy which traverses a zigzag path bouncing back and forth between the resonator reflectors. Thus, the output of each laser is a scanning beam of light, each of the beams of the separate lasers being synchronized. Where the mode-locking device is an active device (e.g., a modulator), then the drive should be set at the transverse mode separation frequency $f_T$. In particular, in a resonator of length L formed by a pair of reflectors of radii $R_1$ and $R_2$, the following relationship should be satisfied to make $f_L$ an integral multiple M of $f_T$:

$$\frac{\Delta f_T}{\Delta f_L} = \frac{1}{M} = \frac{\cos^{-1}\sqrt{g_1 g_2}}{\pi} \quad (5)$$

where $g_1 = 1 - L/R_1$ and $g_2 = 1 - L/R_2$. Of course, $R_1$ and $R_2$ can be equal to each other and the lengths L of each resonator are an integral multiple of each other.

It is also to be understood that the above-described arrangements are merely illustrative of the many possible embodiments which can be devised to represent application of the principles of the invention. Numerous and varied other arrangements can be devised in accordance with these principles by those skilled in the art without departing from the spirit and scope of the invention.

I claim:

1. Apparatus for synchronously mode locking a plurality of lasers each of which oscillates in a plurality of longitudinal modes comprising a first laser having an optical cavity resonator, at least one other laser having an optical cavity resonator of length substantially equal to an integral multiple of the length of said resonator of said first laser, and means located within said resonator of said first laser for mode locking said first laser, said means being common to all of said resonators of said other lasers, thereby to synchronously mode lock all of said other lasers to said first laser.

2. The apparatus of claim 1 wherein said lasers are solid state lasers and said mode-locking means comprises a bleachable dye.

3. The apparatus of claim 1 wherein the deviation from integral multiple of the lengths of said resonators is less than that difference which would time shift the pulses of any one of said lasers by more than the width of said pulses.

4. The apparatus of claim 1 wherein said lasers are gas lasers and said mode-locking means comprises a phase-modulator driven at the longitudinal mode-separation frequency.

5. The apparatus of claim 4 wherein said phase modulator comprises an electro-optic crystal and wherein the propagation vectors of each of the beams of said lasers lie on a cone, the axis of which is coincident with the optic axis of said crystal.

6. The apparatus of claim 1 wherein said mode-locking means comprises an acoustic modulator driven at the longitudinal mode-separation frequency for creating a standing wave of index of refraction in the intracavity path normal to the beams of each of said lasers.

7. The apparatus of claim 1 wherein each of said lasers also oscillates in a plurality of transverse modes and wherein each of said resonators is designed such that the longitudinal mode-separation frequency $f_L$ is an integral multiple M of the transverse mode-separation frequency $f_T$.

8. The apparatus of claim 7 wherein each of the resonators is formed by a pair of reflectors of radii $R_1$ and $R_2$, is of length L and satisfies the following relationship $$\frac{\Delta f_T}{\Delta f_L} = \frac{1}{M} = \frac{\cos^{-1}\sqrt{g_1 g_2}}{\pi}, \text{ where}$$

$g_1 = 1 - L/R_1$ and $g_2 = 1 - L/R_2$.

9. The apparatus of claim 7 wherein said lasers are gas lasers and said mode-locking means comprises a phase-modulator driven at the transverse mode-separation frequency.

10. The apparatus of claim 9 wherein said phase-modulator comprises an electro-optic crystal, and wherein the propagation vectors of each of the beams of said lasers be on a cone, the axis of which is coincident with the optic axis of said crystal.

11. The apparatus of claim 7 wherein said mode-locking means comprises an acoustic modulator driven at the transverse mode-separation frequency.

12. The apparatus of claim 7 wherein said mode-locking means comprises a bleachable dye.